Patented Mar. 9, 1954

2,671,767

UNITED STATES PATENT OFFICE 2,671,767

CONDENSATION OF 1-DIAZOALKANES

Gerard D. Buckley and Neil H. Ray, Northwich, England, assignors to Imperial Chemical Industries Limited, a corporation of Great Britain No Drawing. Application October 9, 1950, Serial No. 189,293

Claims priority, application Great Britain October 13, 1949

7 Claims. (Cl. 260—2)

This invention relates to new polymeric materials and more particularly to hydrocarbon-substituted long carbon chain compounds.

The principal known hydrocarbons in this field are polythene, polyisobutene and polystyrene; and they consist essentially of long chain molecules of general formula

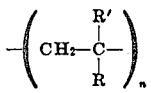

where R and R' may be hydrogen or methyl groups, or R' may be phenyl groups when R is hydrogen. Such substances are made by polymerising hydrocarbons having a carbon-carbon double bond.

According to the present invention, we provide as new chemical substances, polyalkylidenes represented by the general formula

where R is an alkyl group and $n$ is an integer greater than 10 and generally between 50 and 10,000. The preferred alkyl groups contain 1-17 carbon atoms, and R may be more than one alkyl group. Although substantially saturated hydrocarbons, they may contain small proportions of nitrogen, oxygen, or other materials.

We also provide a process for making these substances which comprises contacting certain 1-diazoalkanes with a copper catalyst, for example at room temperature or lower. It is convenient to carry out the reaction in solution in a solvent such as ether, particularly for the lower diazo compounds which are gases. The reaction is carried out in the substantially anhydrous condition. Suitable catalysts include finely divided copper, its alloys, oxides and salts, e. g. precipitated copper powder, copper bronze, anhydrous $CuSO_4$, $Cu_2O$, $Cu_2(CN)_2$, $CuCl_2$.

The substances which we can react in this way are principally diazoethane and 1-diazopropane; higher diazoalkanes such as 1-diazopentane, 1-diazoheptane and 1-diazooctadecane are generally used in admixture with diazomethane, diazoethane and 1-diazopropane. When we react a mixture of diazoalkanes in this way the products are as follows:

With diazomethane

—(CHR)<sub>a</sub>—(CH<sub>2</sub>)<sub>b</sub>—(CHR)<sub>c</sub>—(CH<sub>2</sub>)<sub>d</sub>—
etc.

With diazoethane

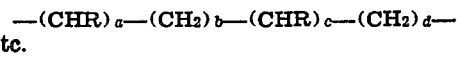
etc.

With diazopropane

etc.

where R is an alkyl group and $a$, $b$, $c$ and $d$ are integers.

In carrying out the reaction, we prefer to dissolve the diazo compound in ether at 0°–20° C., then add the catalyst in several small proportions until the yellow colour of the diazo compound disappears. This generally takes up to an hour but depends on the amount and nature of the catalyst. The solution is filtered and the ether distilled off, leaving the desired product. With more dilute solutions the product has a higher molecular weight. Yields of up to 100% can be obtained. The new substances which can be obtained in this way are polyethylidene

and polypropylidene —(CH($C_2H_5$)—)<sub>n</sub>. In addition, mixed polymers can be made, such as

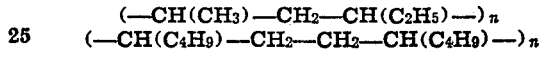

and also those having less frequent side chains. Those where the average value of $n$ lies between 200 and 1000 are particularly useful.

Polyethylidene and polypropylidene are hard, fusible, inert and transparent glasses. The softening point depends on the alkyl group and on the molecular weight, but lies between 85° and 100° C. These substances are amorphous and soluble in ether and hydrocarbons, but not in alcohols. Mixed polymers prepared from diazoethane and/or diazopropane and higher diazoalkanes are similar to polyethylidene and polypropylidene, though usually of lower melting point; they may even be liquids at room temperature. Mixed polymers prepared from diazomethane and one or more higher diazoalkanes containing more than 80% of methylene groups are tough, translucent and flexible materials showing a crystalline X-ray diffraction pattern, are insoluble in ether and cold hydrocarbons but soluble in hot aromatic hydrocarbons such as benzene and toluene. Their melting points are generally higher than those of polyethylidene and polypropylidene, ranging from 100° to 130° C. depending on the proportion of diazomethane used in their preparation. Those containing less than 80% of methylene groups show a gradual transition from the crystalline type to the amorphous type. They are useful in electrical insulation because of their high resistance, low power factor and hardness. They are useful in sheet formation because of their transparency and low refractive index, and can be drawn or rolled. They are also useful in mouldings and in many other arts in which thermoplastic inert resins may be used.

If a bis-diazoalkane such as 1,6-bis-diazohexane is used in this process in admixture with a simple diazoalkane such as diazomethane, the resulting mixed polymer is cross-linked and is insoluble and infusible. Furthermore, those made from a mixture containing only a very small proportion of a bis-diazoalkane, such as 1% or less, are swollen by solvents and can be pressed while hot into films and sheets.

The invention is illustrated but not restricted by the following examples.

*Example 1*

To 1000 parts of an ethereal solution of diazoethane containing 6 parts of diazoethane at 20° C. was added 1 part of freshly precipitated copper powder. Nitrogen was evolved slowly and after 24 hours the reaction was complete, as evidenced by the disappearance of the colour of the diazoethane. The ether was distilled from the filtered solution, leaving as residue 2.7 parts of a glassy polymer of molecular weight 5000, softening point 96° C. (i. e. the temperature at which the substance first sticks to the surface of a heated copper block), melting point 140° C., and containing 84.7% C, 14.3% H, and 0.65% N. It was soluble in ether, acetone, chloroform, and hydrocarbon solvents, but insoluble in water and alcohols. It melted to a clear glass having refractive index 1.495.

*Example 2*

To 1000 parts of an ethereal solution of diazoethane containing 10 parts of diazoethane at 20° C. was added 1 part of anhydrous cupric sulphate. Nitrogen was evolved vigorously and after 5 minutes the reaction was complete. The product (isolated as before) was 5 parts of a glassy polymer having a molecular weight of 7000, and which was in other respects similar to the previous product.

*Example 3*

To 1000 parts of ethereal solution containing 18 parts of diazoethane at 20° C. was added 1 part of anhydrous cuprous cyanide. A rapid reaction ensued, which was complete in 5 minutes. The product (isolated as before) was 9 parts of a soft, semi-solid polymer of molecular weight 2000.

*Example 4*

To 1000 parts of an ethereal solution containing 11 parts of 1-diazopropane at 20° C. was added 1 part of copper powder. After 50 minutes the reaction was complete, and the solution was filtered and evaporated, leaving 6.5 parts of a glassy polymer of molecular weight 7000 and similar in appearance to the product from diazoethane.

*Example 5*

To 700 parts of an ethereal solution of diazoethane and diazomethane containing 7 parts of diazomethane and ⅓ part of diazoethane was added 1 part of copper powder. After 24 hours the solution was colourless, and the precipitated polymer was collected on a filter. The copper was extracted from it with hot dilute nitric acid, leaving 1 part of a tough white solid polymer of molecular weight 4000, melting point 115° C., and containing approximately 30 ethylidene units to 70 methylene units in the molecule.

*Example 6*

To 400 parts of an ethereal solution containing 8 parts of diazomethane and ½ part of 1-diazoheptane was added ½ part of copper powder. The solution was colourless after 12 hours and the product, isolated as in Example 5, was 2 parts of a tough, white, translucent polymer having a melting point of 124° C., a molecular weight of 7000, and 85% crystallinity; it contained 3 branches per 100 carbon atoms in the chain.

*Example 7*

To 400 parts of an ethereal solution containing 8 parts of diazomethane and 1 part of 1,6-bis-diazohexane was added ½ part of copper powder. After 12 hours the solution was colourless and the product, isolated as in Example 5, was 2 parts of a hard brittle solid which decomposed without melting at 350° C. and was insoluble in all solvents. It could be pressed out into a brittle film at 150° C. under a pressure of 1 ton/square inch.

What we claim is:

1. A process for the manufacture of polyalkylidenes which comprises contacting an ethereal solution of at least one 1-diazo derivative of a hydrocarbon of the formula R—CH$_3$, where R is an alkyl group of 1 to 17 carbon atoms, with a copper catalyst at a temperature of between 0° and 20° C. until the color of said diazo compound disappears while allowing evolution of nitrogen and separating the resulting product from the ether.

2. The process of claim 1 wherein said 1-diazo derivative is 1-diazoethane.

3. The process of claim 1 wherein said 1-diazo derivative is 1-diazopropane.

4. The process of claim 1 wherein said 1-diazo derivative is 1,6-bis-diazohexane admixed with diazomethane.

5. The product of claim 2, said product characterized by being a hard, fusible, inert and transparent glass and having a molecular weight of at least 5000.

6. The product of claim 3, said product characterized by being a hard, fusible, inert and transparent glass and having a molecular weight of at least 5000.

7. The product of claim 4, said product characterized by being hard, insoluble and infusible.

GERARD D. BUCKLEY.
NEIL H. RAY.

References Cited in the file of this patent

UNITED STATES PATENTS

| Number | Name | Date |
|---|---|---|
| 2,352,328 | Kleine | June 27, 1944 |
| 2,387,784 | Thomas | Oct. 30, 1945 |
| 2,405,950 | Hanford | Aug. 20, 1946 |

OTHER REFERENCES

Leitch et al.: "National Research Council of Canada Review," page 94 (1948).

Meerwein: Angew. Chemie, A60, No. 3, page 78 (March 1948).